United States Patent
Kang

(10) Patent No.: US 8,850,917 B2
(45) Date of Patent: Oct. 7, 2014

(54) SPINDLE DRIVE

(75) Inventor: Seong Keun Kang, Gyeongsangnam-Do (KR)

(73) Assignee: Doosan Infracore Co., Ltd., Incheon (KR)

(*) Notice: Subject to any disclaimer, the term of this patent is extended or adjusted under 35 U.S.C. 154(b) by 586 days.

(21) Appl. No.: 13/140,532

(22) PCT Filed: Nov. 2, 2009

(86) PCT No.: PCT/KR2009/006372
§ 371 (c)(1),
(2), (4) Date: Jun. 17, 2011

(87) PCT Pub. No.: WO2010/071299
PCT Pub. Date: Jun. 24, 2010

(65) Prior Publication Data
US 2011/0247441 A1    Oct. 13, 2011

(30) Foreign Application Priority Data
Dec. 19, 2008 (KR) .................. 10-2008-0130682

(51) Int. Cl.
*F16H 55/18* (2006.01)
*B23Q 5/04* (2006.01)
*B23Q 5/56* (2006.01)

(52) U.S. Cl.
CPC . *B23Q 5/56* (2013.01); *B23Q 5/048* (2013.01)
USPC ............................................. 74/409; 74/406

(58) Field of Classification Search
CPC .......... F16H 55/18; F16H 55/28; F16H 55/24
USPC ................................................ 74/409, 411
See application file for complete search history.

(56) References Cited

U.S. PATENT DOCUMENTS 2,302,575 A * 11/1942 Romaine et al. ............... 74/409
2,717,522 A *  9/1955 Mottu ............................. 74/409
(Continued)

FOREIGN PATENT DOCUMENTS

CN    2719485 Y    8/2005
EP    0267572 A2   5/1988
(Continued)

OTHER PUBLICATIONS

International Search Report: Mailed Apr. 30, 2010; Appln. PCT/KR2009/006372.

*Primary Examiner* — Troy Chambers
*Assistant Examiner* — Zakaria Elahmadi
(74) *Attorney, Agent, or Firm* — Ladas & Parry LLP

(57) ABSTRACT

The present invention relates to a spindle drive. A spindle drive according to an exemplary embodiment of the present invention includes: a body that is disposed at a side of a machine tool; a spindle that is disposed at the body, with a ring gear disposed thereunder; a gear box that is disposed at a side of the body; a plurality of driven shafts that is disposed at the gear box and engaged with the ring gear; an idle shaft that is disposed at the gear box and engaged with a plurality of driven gears at a side; a high-speed driving shaft that is disposed at the gear box and drives the idle shaft while changing the speed by a driving force of a spindle motor; a low-speed driving gear that is disposed at the gear box, engaged with the driven shafts, and pressed by a pressing unit such that backlash is removed; a decelerator that is disposed at the low-speed driving gear and driven by a servomotor to drive the low-speed driving gear; and a clutch unit that is disposed between the servomotor and the low-speed driving gear and controls power transmission of the servomotor.

5 Claims, 6 Drawing Sheets

(56) References Cited

U.S. PATENT DOCUMENTS

| | | | | |
|---|---|---|---|---|
| 2,896,465 | A | * | 7/1959 | Armitage et al. ............... 74/409 |
| 2,968,965 | A | * | 1/1961 | Swanson et al. ................ 74/409 |
| 4,643,037 | A | * | 2/1987 | Kis .................................. 74/342 |
| 5,148,715 | A | * | 9/1992 | Blaser et al. .................... 74/325 |
| 5,188,004 | A | * | 2/1993 | Kitagawa .................... 74/813 R |
| 2003/0154811 | A1 | * | 8/2003 | Hattori et al. .................. 74/331 |
| 2009/0074525 | A1 | * | 3/2009 | Jaillon ......................... 408/132 |

FOREIGN PATENT DOCUMENTS

| | | |
|---|---|---|
| JP | 2008-106894 A | 5/2008 |
| KR | 10-0455576 B1 | 11/2004 |
| KR | 10-0719211 B1 | 5/2007 |
| KR | 10-0824522 B1 | 4/2008 |
| WO | 2008/050658 A1 | 5/2008 |

* cited by examiner

SPINDLE DRIVE

TECHNICAL FIELD

The present invention relates to a spindle drive, and more particularly, to a spindle drive that rotates a spindle where a workpiece is disposed.

BACKGROUND ART

In general, in machining tools, machining is implemented by relative rotation between a workpiece and a tool, the workpiece may be disposed, for example, on a chuck and rotary table, and a gear may be used as a transmission element.

In particular, transmission by gears has a characteristic, heat generation.

Further, it is required to rotate the spindle at high, medium, and low rotation speed, in accordance with how the workpiece will be machined. For example, the spindle may be rotated at a high or medium speed in simple turning of the outer circumference of the workpiece and may be rotated at a low speed when machining a key groove or a pin hole etc.

As described above, when the spindle is rotated at a high or medium speed, the spindle may function as a main shaft, in which backlash may be generated, but it is not necessary to remove the backlash.

Further, accurate rotation is necessary when indexing or milling the workpiece disposed on the spindle, and particularly, forward rotation and backward rotation may be repeated and the backlash should be removed for precision machining.

However, as described above, when multi-machining is applied to one workpiece, for example, when machining and milling of the outer circumference are performed, it is required first to rotate the spindle at a high speed and it is required to precisely rotate the spindle at a low speed for milling; however, the spindles of the related art can perform any one function in selection of a high speed or a low speed, such that the multi-machining cannot be performed.

Further, when a spindle (for example, a rotary table) that can be precisely rotated, with backlash removed, is rotated at a high speed, more heat is generated by the operation of gears, such that it is difficult to smoothly machine the workpiece.

DISCLOSURE

Technical Problem

An object of the present invention is to provide a spindle drive that can perform multi-machining of a workpiece by being allowed to control removing and returning backlash such that precise and high-speed rotation of a spindle is possible.

The technical problems are not limited to the foregoing technical problems. Other technical problems, which are not described, can clearly be understood by those skilled in the art from the following description.

Technical Solution

In order to achieve the above object, a spindle drive according to an exemplary embodiment of the present invention includes: a body that is disposed at a side of a machine tool; a spindle that is disposed at the body, with a ring gear disposed thereunder; a gear box that is disposed at a side of the body; a plurality of driven shafts that is disposed at the gear box and engaged with the ring gear; an idle shaft that is disposed at the gear box and engaged with a plurality of driven gears at a side; a high-speed driving shaft that is disposed at the gear box and drives the idle shaft while changing the speed by a driving force of a spindle motor; a low-speed driving gear that is disposed at the gear box, engaged with any one of the driven shafts, and pressed by a pressing unit such that backlash is removed; a decelerator that is disposed at the low-speed driving gear and driven by a servomotor to drive the low-speed driving gear; and a clutch unit that is disposed between the servomotor and the low-speed driving gear and controls power transmission of the servomotor.

The spindle drive includes: a first transmission driving gear that is disposed at the upper portion of the driving shaft; a second transmission driving gear that is disposed at the lower portion of the driving shaft by a spline and linearly moves; a third transmission driving gear that is disposed at the driving shaft by a spline, linearly moves, and is engaged with the first transmission driving gear; an actuator that is disposed at a side of the gear box and moves the second transmission driving gear and the third transmission driving gear to predetermined positions; a first transmission driven gear that is disposed at the upper portion of the idle shaft and engaged with the first transmission driving gear; and a second transmission driven gear that is disposed at the upper portion of the idle shaft and engaged with the second transmission driving gear.

Further, the predetermined positions may be a high-speed position where the first transmission driving gear and the third transmission driving gear are engaged and the second transmission driving gear and the second transmission driven gear are disengaged such that high-speed power is transmitted, a neutral position where the first transmission driving gear and the third transmission driving gear are disengaged and the second transmission driving gear and the second transmission driven gear are disengaged such that power is not transmitted; and a low-speed position where the first transmission driving gear and the third transmission driving gear are disengaged and the second transmission driving gear and the second transmission driven gear are engaged such that medium-speed power is transmitted.

In addition, in the pressing unit, a cylinder chamber is formed at a side of the gear box, an up-down movable shaft is disposed in the cylinder chamber, and the low-speed driving gear is disposed under the up-down movable shaft, such that the up-down movable shaft is moved down by hydraulic pressure supplied to the chamber and presses the low-speed driving gear.

Moreover, in the clutch unit, a first curvic coupling gear is formed at the lower end of the up-down movable shaft, a second curvic coupling gear is formed at the lower end of the low-speed driving gear, a third curvic coupling gear is formed at the upper portion, apart from the low-speed driving gear, and a curvic coupling member that is moved up/down by hydraulic pressure is disposed, such that the third curvic coupling gear and the first and second curvic coupling gears can be engaged or disengaged by the up-down movement of the curvic coupling member, thus controlling power transmission.

The details of other exemplary embodiments are included in the detailed specification and the drawings.

Advantageous Effects

The spindle drive according to exemplary embodiments of the present invention can remove or keep backlash, such that it is possible to rotate a spindle at a high speed by driving a spindle motor and precisely rotate the spindle at a low speed by driving a servomotor.

Further, as described above, the spindle drive according to exemplary embodiments of the present invention can change the speed into high speed and low speed, such that it is possible to more variously machine a workpiece.

Figure 1:
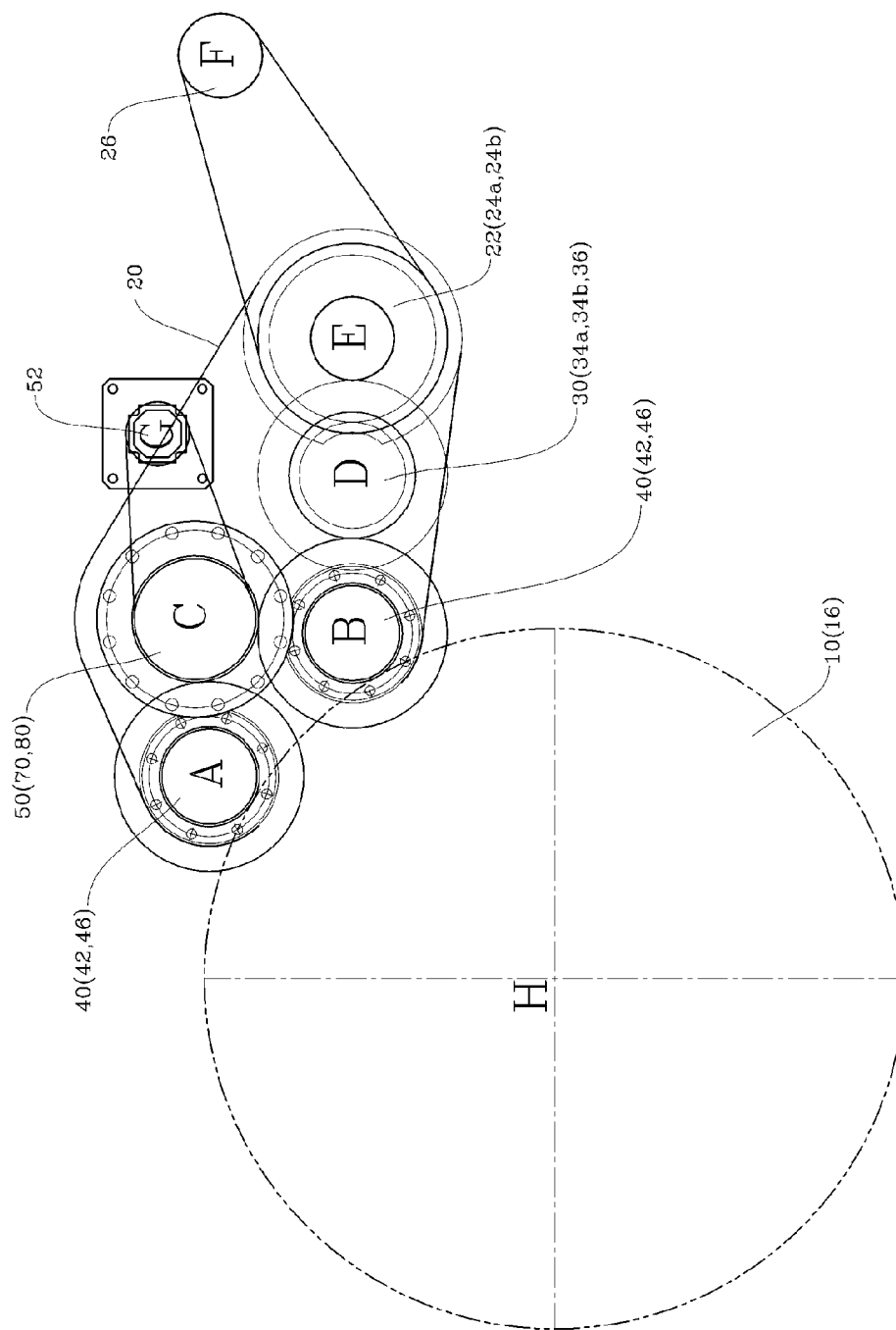
FIG. 1 is an exemplary plan view illustrating a spindle drive according to an exemplary embodiment of the present invention.

<Explanation of Main Reference Numerals and Symbols>

| | | | |
|---|---|---|---|
| 10: | Spindle | 12: | Body |
| 14: | Main shaft | 16: | Ring gear |
| 20: | Gear box | 22: | High-speed driving shaft |
| 24a: | First transmission driving gear | 24b: | Second transmission driving gear |
| 26: | Spindle motor | 30: | Idle shaft |
| 34a: | First transmission driven gear | 34b: | Second transmission driven gear |
| 36: | First gear | 40: | Driven shaft |
| 40a, 40b: | First and second driven shafts | 42: | Driven gear |
| 46: | Driving gear | 50: | Decelerator |
| 52: | Servomotor | 60: | Pressing unit |
| 70: | Up-down movable shaft | 80: | Low-speed driving gear |
| 90: | Clutch unit | | |

BEST MODE

A spindle drive according to an exemplary embodiment of the present invention includes: a body 12 that is disposed at a side of a machine tool; a spindle 10 that is disposed at the body, with a ring gear 16 disposed thereunder; a gear box 20 that is disposed at a side of the body 12; a plurality of driven shafts 40 that is disposed at the gear box 20 and engaged with the ring gear 16; an idle shaft 30 that is disposed at the gear box 20 and engaged with a plurality of driven gears 42 at a side; a high-speed driving shaft 22 that is disposed at the gear box 20 and drives the idle shaft 30 while changing the speed by a driving force of a spindle motor 26; a low-speed driving gear 80 that is disposed at the gear box 20, engaged with the driven shafts 40, and pressed by a pressing unit 60 such that backlash is removed; a decelerator 50 that is disposed at the low-speed driving gear 80 and driven by a servomotor 52 to drive the low-speed driving gear 80; and a clutch unit 90 that is disposed between the servomotor 52 and the low-speed driving gear 80 and controls power transmission of the servomotor.

MODE FOR INVENTION

Advantages and features of the present invention and methods to achieve them will be elucidated from exemplary embodiments described below in detail with reference to the accompanying drawings.

Like reference numerals designate like components throughout the specification.

Hereinafter, a spindle drive according to an exemplary embodiment of the present invention will be described with reference to FIGS. 1 to 4.

Figure 2:
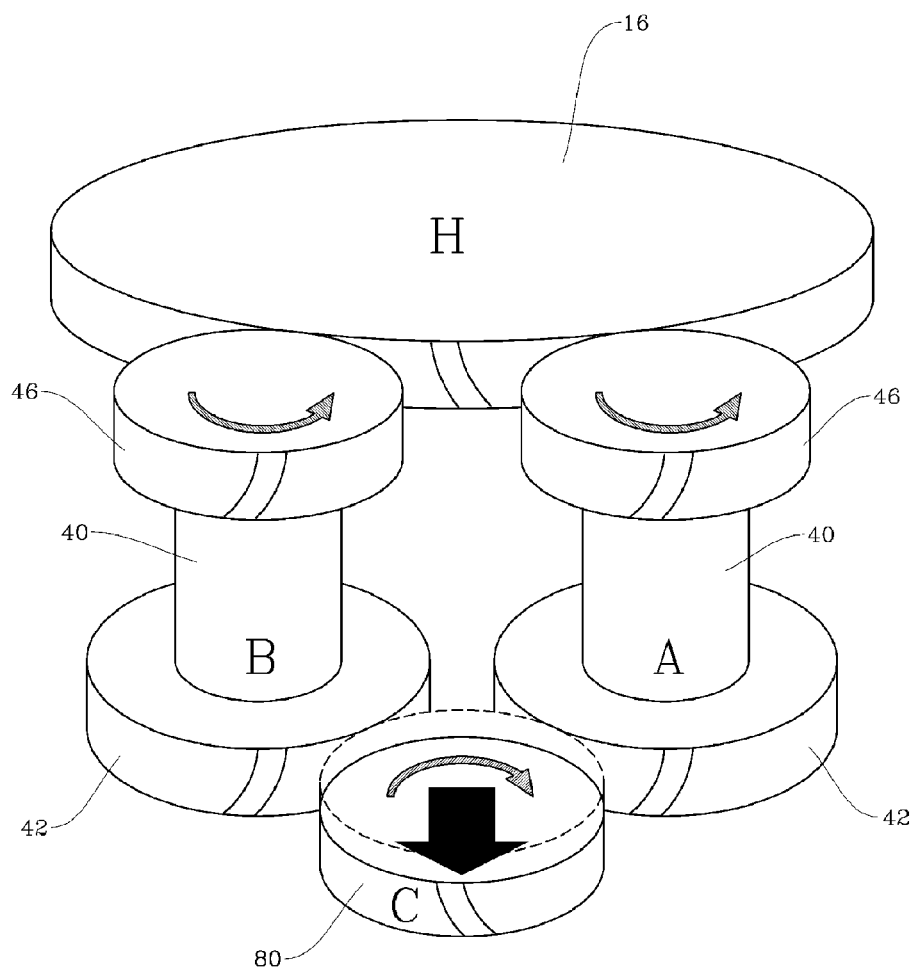
FIG. 2 is an exemplary view illustrating arrangement of gears in the spindle drive according to an exemplary embodiment of the present invention.
Figure 3:
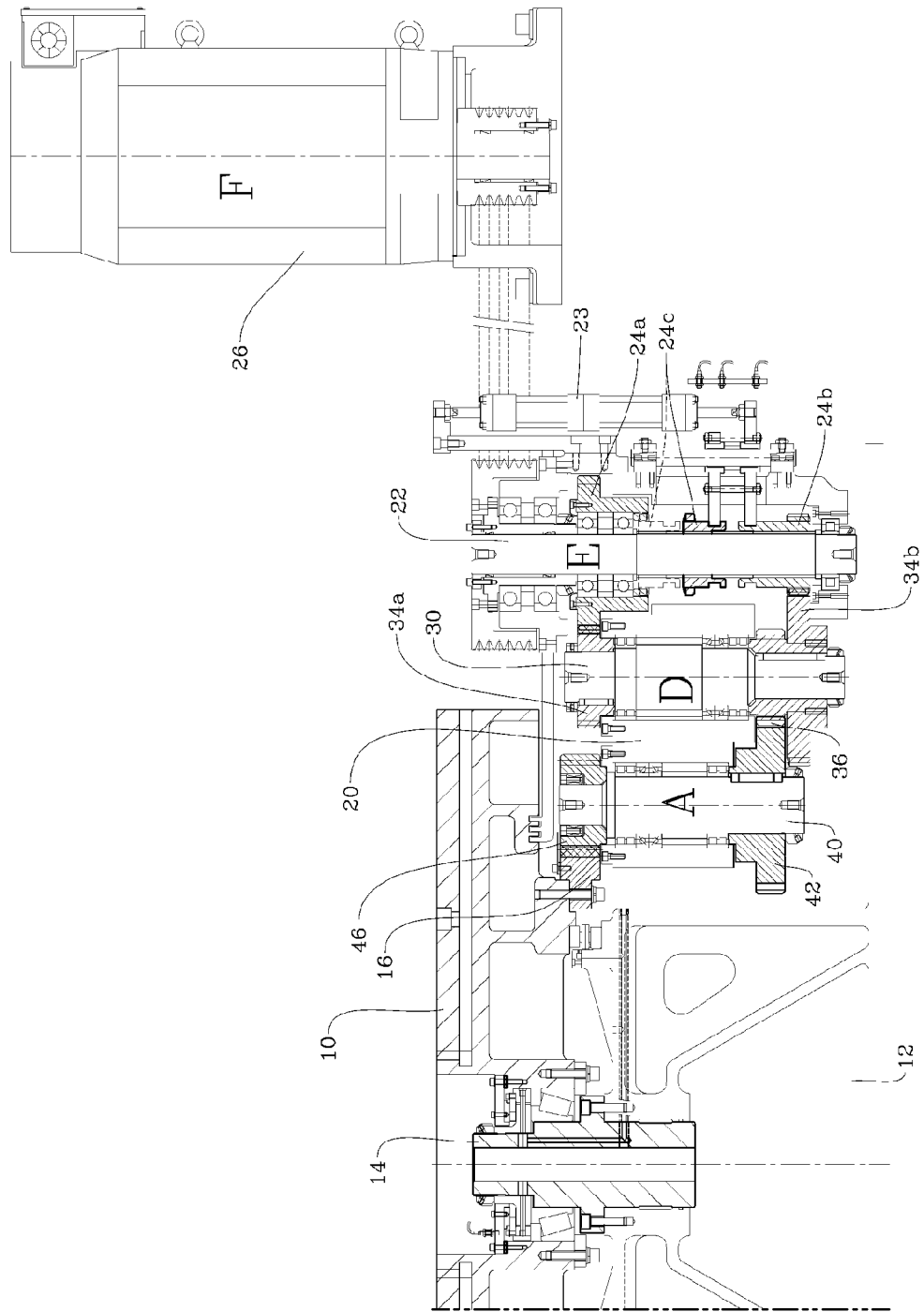
FIG. 3 is a view illustrating an example of driving a spindle at a high speed or a medium speed in the spindle drive according to an exemplary embodiment of the present invention.
Figure 4:
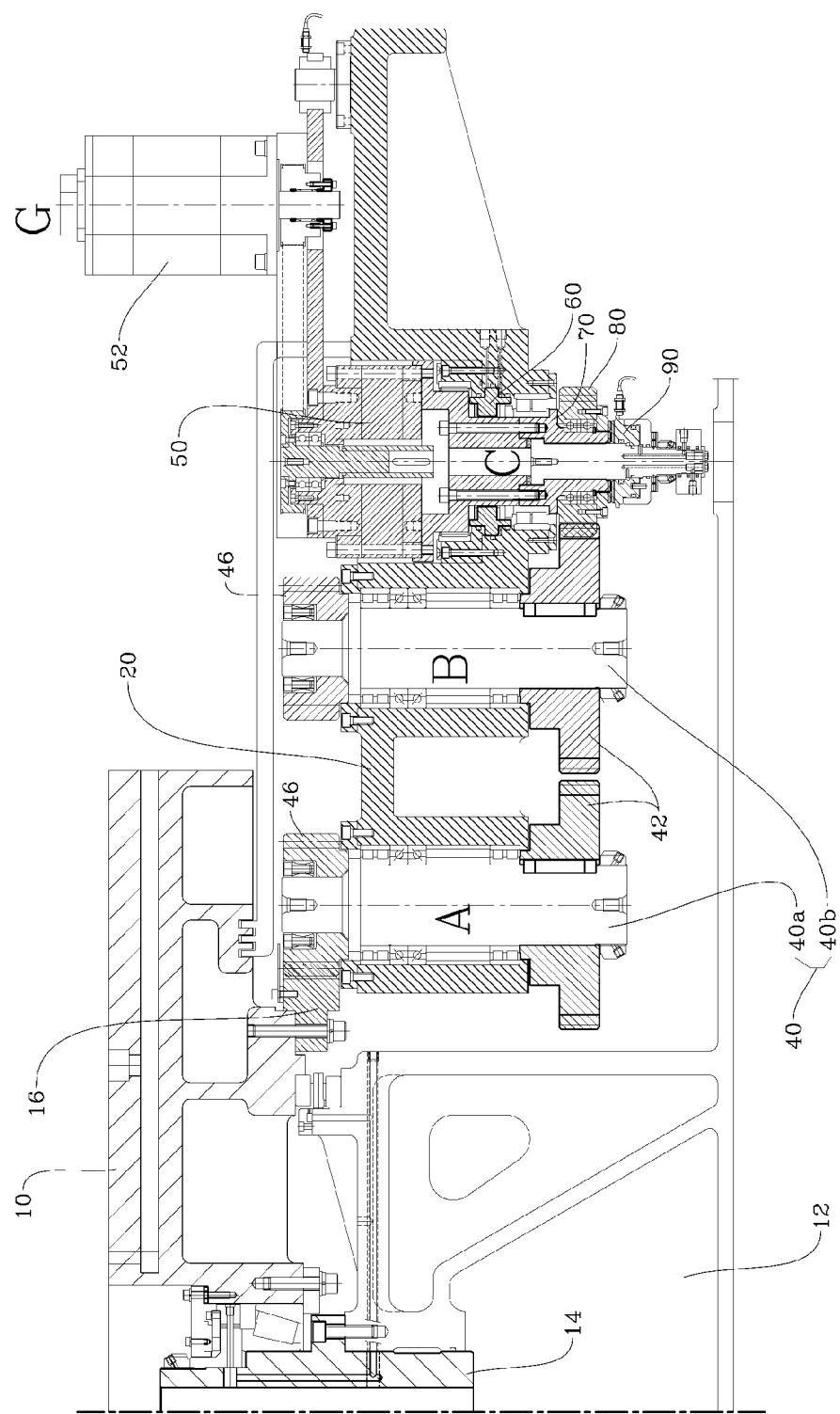
FIG. 4 is a view illustrating an example of precisely rotating a spindle at a low speed in the spindle drive according to an exemplary embodiment of the present invention.

In the accompanying drawings, FIG. 1 is an exemplary plan view illustrating a spindle drive according to an exemplary embodiment of the present invention, FIG. 2 is an exemplary view illustrating arrangement of gears in the spindle drive according to an exemplary embodiment of the present invention, FIG. 3 is a view illustrating an example of driving a spindle at a high speed or a medium speed in the spindle drive according to an exemplary embodiment of the present invention, and FIG. 4 is a view illustrating an example of precisely rotating a spindle at a low speed in the spindle drive according to an exemplary embodiment of the present invention.

A spindle drive according to the exemplary embodiment of the present invention is disposed at one side in a machine tool.

That is, a body 12 is disposed at a side of a machine tool, a main shaft 14 is coupled to the body 12, and a spindle 10 is mounted on the main shaft 14.

In particular, the spindle 10 may be used like a rotary table and called a rotary table.

A ring gear 16 is disposed under the spindle 10, as shown in FIGS. 3 and 4.

Further, a gear box 20 may be disposed at a side of the body 12 and a plurality of shafts may be coupled to the gear box 20.

A plurality of driving gears 46 may be engaged with the ring gear 16, as shown in FIGS. 1 and 2, and a driven shaft 40 may be fitted in each of the driving gears 46.

That is, a plurality of driven shafts 40 may be disposed and may be coupled to a side of the gear box 20.

Further, driven gears 42 may be disposed under the driven shafts 40, respectively.

In addition, a single low-speed driving gear 80 may be engaged with the driven gears 42 and a first gear 36 may be engaged with any one of the driven gears 42.

A gear train engaged with the first gear 36 is configured to rotate the spindle 10 at a high or low speed and the configuration will be described in detail with reference to FIG. 3.

Further, the gear train engaged with the low-speed driving gear 80 is configured to precisely rotate the spindle 10 at a low speed and the configuration will be described in detail with reference to FIG. 4.

As shown in FIG. 3, the first gear 36 is fitted on an idle shaft 30 and the idle shaft 30 is coupled to a side of the gear box 20.

Further, first and second transmission driven gears 34a and 34b are disposed above and under the idle shaft 30.

In addition, a high-speed driving shaft 22 is disposed at one side of the gear box 20 and an actuator 23 is disposed at the other side of the gear box 20.

A first transmission driving gear 24a is fitted on a side of the high-speed driving shaft 22 and a second transmission driving gear 24b is fitted on the lower portion of the high-speed driving shaft 22 by a spline. Further, a third transmission driving gear 24c is fitted on a side of the high-speed driving shaft 22 by a spline, between the first transmission driving gear 24a and the second transmission driving gear 24b.

That is, the second and third transmission driving gears 24b and 24c are rotated by the rotation of the high-speed driving shaft 22 and can move linearly along the spline formed on the high-speed driving shaft 22.

Further, the actuator 23 can move the second and third transmission driving gears 24b and 24c to predetermined positions.

The predetermined positions may be a high-speed position, a neutral position, and a low-speed position.

The high-speed position may be a position where the first transmission driving gear 24a and the third transmission driving gear 24c are engaged and the second transmission driving gear 24b and the second transmission driven gear 34b are disengaged, such that high-speed power can be transmitted.

Further, the neutral position may be a position where the first transmission driving gear 24a and the third transmission driving gear 24c are disengaged and the second transmission driving gear 24b and the second transmission driven gear 34b are disengaged, such that transmission of power is prevented.

In addition, the low-speed position may be a position where the first transmission driving gear 24a and the third transmission driving gear 24c are disengaged and the second transmission driving gear 24b and the second transmission driven gear 34b are engaged, such that medium-speed power can be transmitted.

On the other hand, a plurality of sensors may be further disposed at a side of the actuator 23 and the sensors can detect the extension/contraction positions of a rod of the actuator 23, at the predetermined positions.

Further, a belt and a pulley may be used as the elements that can receive power from a spindle motor 26 and transmit the power, above the high-speed driving shaft 22.

Hereinafter, a configuration for accurate low-speed rotation is described with reference to FIGS. 4 and 5.

Figure 5:
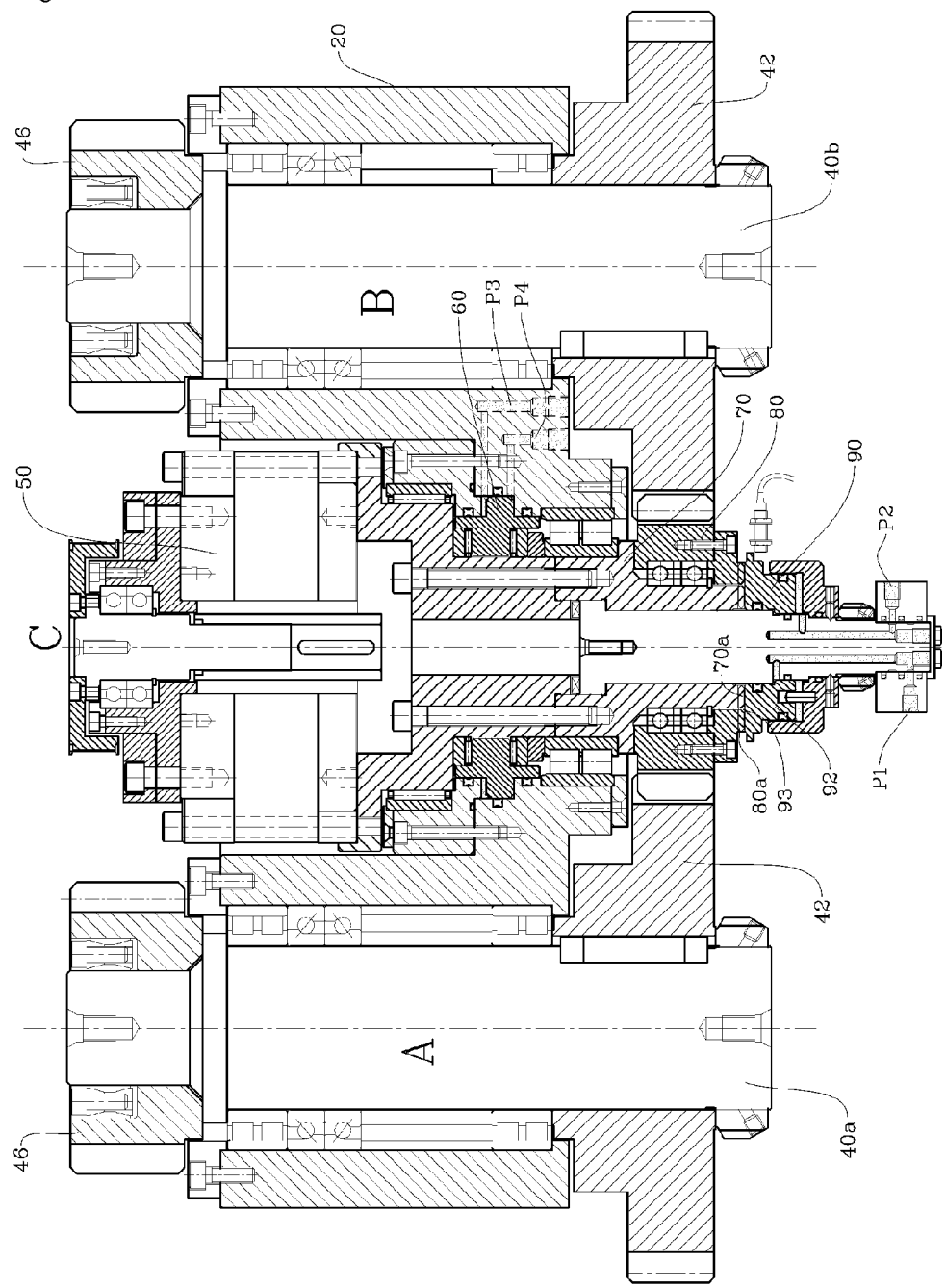
FIGS. 5 and 6 are exemplary views illustrating removal of backlash in the spindle drive according to an exemplary embodiment of the present invention.

As shown in FIGS. 4 and 5, an up-down movable shaft 70 may be coupled to a side of the gear box and a decelerator 50 may be disposed above the up-down movable shaft 70 and can reduce speed by receiving a driving force from a servomotor 52.

Further, the power transmission elements for the decelerator 50 and the servomotor 52 may be a timing belt and a timing pulley, such that it is possible to perform numerical control and control the amount of rotation by a desired rotation angle.

In addition, the up-down movable shaft 70 may be moved down by a pressing unit 60 and power can be transmitted or cut between the up-down movable shaft 70 and the low-speed driving gear 80 by a clutch unit 90.

In the pressing unit 60, a cylinder chamber is formed at a side of the gear box 20, the up-down movable shaft 70 is disposed in the cylinder chamber, and a plurality of hydraulic channels is formed in the cylinder chamber.

That is, as hydraulic pressure is supplied to any one hydraulic channel P3, the up-down movable shaft 70 may be moved down, while as hydraulic pressure is supplied to another hydraulic channel P4, the up-down movable shaft 70 may be moved up.

On the other hand, as the up-down movable shaft 70 is moved up/down by the pressing unit 60, the decelerator 50 may also be moved up/down, such that a second sensor may be further disposed to detect the up/down positions of the decelerator 50.

That is, the second sensor can detect the position of the up-down movable shaft 70 that is moved up/down by the pressing unit 60, and for example, when a signal is detected from the second sensor, pressing may be being performed, or when a signal is not detected from the second sensor, the pressing may have been stopped.

The low-speed driving gear 80 is fitted on the lower portion of the up-down movable shaft 70 and engaged with the driven gears 42.

In the clutch unit 90, a first curvic coupling gear 70a is formed at the lower end of the up-down movable shaft 70, a second curvic coupling gear 80a is formed at the lower end of the low-speed driving gear 80, a third curvic coupling gear 93 is formed at the upper portion, apart from the low-speed driving gear 80, and a curvic coupling member 92 that is moved up/down by hydraulic pressure is disposed, such that the third curvic coupling gear 93 and the first and second curvic coupling gears 70a and 80a can be engaged or disengaged by the up-down movement of the curvic coupling member 92, thus controlling power transmission.

Further, a first sensor may be further disposed at a side of the curvic coupling member 92 and allows for knowing whether the clutch unit 90 transmits or cuts power now, by detecting the up-down position of the curvic coupling member 92.

The operation of the spindle drive having the configuration according to the exemplary embodiment of the present invention is described in detail with reference to FIGS. 3 and 4.

First, rotating a spindle at a high or low speed to machine the outer circumference of a workpiece is described.

In this operation, since the power of a low-speed precise rotation member should be cut, the servomotor 52 is kept stopped and the pressing member 60 operates to move up the up-down movable shaft 70 such that backlash is generated between the driven gear 42 and the low-speed driving gear 80.

Further, the clutch unit 90 cuts the power, such that the low-speed driving gear 80 is kept idle, at the up-down movable shaft 70.

Thereafter, as a medium speed or a high speed is set, transmission is performed to fit to the set value, such that the first driving gear 24a and the first transmission driven gear 34a are engaged or the second transmission driving gear 24b and the second transmission driven gear 34b are engaged, thereby determining a speed.

Thereafter, as power is transmitted by the operation of the spindle motor 26, the spindle 10 is rotated at a high speed or a low speed, in which backlash is generated between the ring gear 16 and the driven gears 42. Accordingly, smooth operation, such as the operation of a general spindle, is achieved, such that machining or high-speed cutting of the outer circumference of the workpiece is performed at the medium-speed or high-speed operation.

Hereafter, the operation of rotating the spindle at a low speed to perform milling or groove-machining of a workpiece is described.

In this operation, since the power for the high-speed rotation member should be cut, the spindle motor 26 is kept stopped and the transmission position becomes the neutral position, such that the idle shaft 30 and the first and second transmission driven gears 34a and 34b fitted on the idle shaft 30 are kept idle.

Thereafter, the pressing unit 60 operates to move down the up-down movable shaft 70, such that backlash between the driven gear 42 and the low-speed driving gear 80 is removed.

Removing the backlash is described in more detail.

The ring gear 16, the driven gears 42, and the low-speed driving gear 80 may be helical gears, in which the teeth direction of the helical gears may be in the left line or the right line, but the backlash is the same regardless of the teeth direction.

That is, as the low-speed driving gear 80 is pressed down, the teeth of the low-speed driving gear 80 and the teeth of the driven gears 42 come in close contact with each other while the driven gears 42 are engaged with the ring gear 16 at two positions, such that backlash is removed.

Therefore, since the backlash has been removed when the rotation of the low-speed driving gear 80 is changed to the opposite direction, the ring gear can 16 directly rotate in the opposite direction, such that precise rotation is possible.

Figure 6:
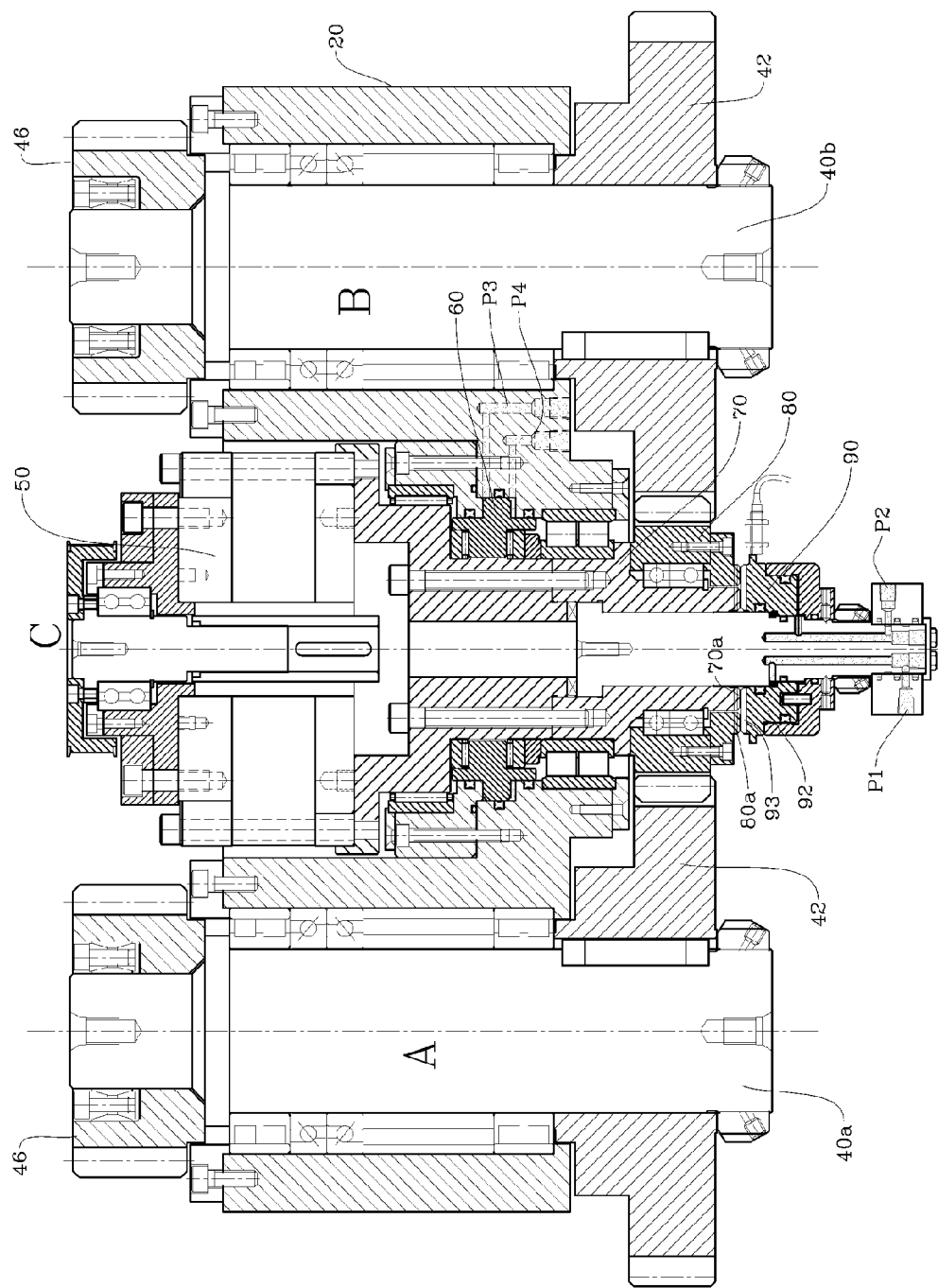

Further, the curvic coupling member 92 can be moved up or down by the operation of the clutch unit 90. FIG. 5 is an exemplary view showing when the curvic coupling member 92 has been moved up and FIG. 6 is an exemplary view showing when the curvic coupling member 92 has been moved down.

That is, the servomotor 52 is driven, with the curvic coupling member 92 moved up. The servomotor 52 can be rotated by low-speed precise numerical control.

Therefore, the power of the servomotor 52 is reduced at a low speed and transmitted to the ring gear 16 through the low-speed driving gear 80 and the driven gear 42, such that the spindle 10 can be precisely rotated at a low speed.

As described above, the spindle drive according to the exemplary embodiment of the present invention can rotate the common spindle 10 at a high speed or a medium speed, or can perform low-speed precise rotation control, such that it can appropriately control the rotation of the spindle 10 in accordance with the characteristics of the work while machining a workpiece. Therefore, it is possible to machine a workpiece with higher quality by more actively dealing with machining of complicate shapes.

Although exemplary embodiments of the present invention have been described above with reference to the drawings, it will be understood to those skilled in the art that the present invention may be implemented in various ways without changing the spirit of necessary features of the present invention.

Therefore, the exemplary embodiments described above should be construed as being exemplified and not limiting the present invention, the scope of the disclosure is characterized by the detailed description of the following claims, and all changes and modifications from the meaning, range, and equivalent concept of claims should be construed as being included in the present invention.

INDUSTRIAL APPLICABILITY

A spindle drive according to an exemplary embodiment of the present invention may be used as the main shaft of a lathe or as a rotary table, in a machine tool.

The invention claimed is:
1. A spindle drive, comprising:
a body that is disposed at a side of a machine tool;
a spindle that is disposed at the body, with a ring gear disposed thereunder;
a gear box that is disposed at a side of the body;
a plurality of driven shafts that is disposed at the gear box and engaged with the ring gear;
an idle shaft that is disposed at the gear box and engaged with a plurality of driven gears at a side;
a high-speed driving shaft that is disposed at the gear box and drives the idle shaft while changing the speed by a driving force of a spindle motor;
a low-speed driving gear that is disposed at the gear box, engaged with the driven shafts, and pressed by a pressing unit such that backlash is removed;
a decelerator that is disposed at the low-speed driving gear and driven by a servomotor to drive the low-speed driving gear;
a clutch unit that is disposed between the servomotor and the low-speed driving gear and controls power transmission of the servomotor;
a first transmission driving gear that is disposed at the upper portion of the driving shaft;
a second transmission driving gear that is disposed at the lower portion of the driving shaft by a spline and linearly moves; and
a third transmission driving gear that is disposed at the driving shaft by a spline, linearly moves, and is engaged with the first transmission driving gear.

2. The spindle drive according to claim 1, comprising:
an actuator that is disposed at a side of the gear box and moves the second transmission driving gear and the third transmission driving gear to predetermined positions;
a first transmission driven gear 34a that is disposed at the upper portion of the idle shaft and engaged with the first transmission driving gear; and
a second transmission driven gear that is disposed at the lower portion of the idle shaft and engaged with the second transmission driving gear.

3. The spindle drive according to claim 2, wherein the predetermined positions are a high-speed position where the first transmission driving gear and the third transmission driving gear are engaged and the second transmission driving gear and the second transmission driven gear are disengaged such that high-speed power is transmitted,
a neutral position where the first transmission driving gear and the third transmission driving gear are disengaged and the second transmission driving gear and the second transmission driven gear are disengaged such that power is not transmitted; and
a low-speed position where the first transmission driving gear and the third transmission driving gear are disengaged and the second transmission driving gear and the second transmission driven gear are engaged such that low-speed power is transmitted.

4. The spindle drive according to claim 1, wherein in the pressing unit, a cylinder chamber is formed at a side of the gear box, an up-down movable shaft is disposed in the cylinder chamber, and the low-speed driving gear is disposed under the up-down movable shaft, such that the up-down movable shaft is moved down by hydraulic pressure supplied to the chamber and presses the low-speed driving gear.

5. The spindle drive according to claim 1, wherein in the clutch unit, a first curvic coupling gear is formed at the lower end of the up-down movable shaft, a second curvic coupling gear is formed at the lower end of the low-speed driving gear, a third curvic coupling gear is formed at the upper portion, apart from the low-speed driving gear, and a curvic coupling member that is moved up/down by hydraulic pressure is disposed, such that the third curvic coupling gear and the first and second curvic coupling gears and can be engaged or disengaged by the up-down movement of the curvic coupling member, thus controlling power transmission.

* * * * *